(12) United States Patent
Nield et al.

(10) Patent No.: US 10,877,760 B2
(45) Date of Patent: Dec. 29, 2020

(54) SELECTION OF DATA FOR PROCESSOR PIPELINES USING MULTIPLE SUPPLY LINES WHEREIN IN ONE OF TWO MODES THE SAME DATA IS SUPPLIED TO BOTH INPUTS OF A PROCESSING ELEMENT

(71) Applicant: Imagination Technologies Limited, Kings Langley (GB)

(72) Inventors: Simon Nield, Wendover (GB); Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 88 days.

(21) Appl. No.: 15/872,106

(22) Filed: Jan. 16, 2018

(65) Prior Publication Data

US 2018/0203701 A1 Jul. 19, 2018

(30) Foreign Application Priority Data

Jan. 16, 2017 (GB) .................................. 1700690.9

(51) Int. Cl.
*G06F 9/30* (2018.01)
*G06F 15/80* (2006.01)
(Continued)

(52) U.S. Cl.
CPC .......... *G06F 9/30189* (2013.01); *G06F 7/575* (2013.01); *G06F 9/3001* (2013.01);
(Continued)

(58) Field of Classification Search
CPC .. G06F 9/30189; G06F 9/3001; G06F 9/3869; G06F 15/8007; G06F 9/3867;
(Continued)

(56) References Cited

U.S. PATENT DOCUMENTS 6,577,317 B1  6/2003  Duluk, Jr. et al.
7,636,835 B1  12/2009  Ramey et al.
(Continued)

FOREIGN PATENT DOCUMENTS

EP  0 517 013 A2  12/1992

OTHER PUBLICATIONS

Junkins, S. 'The Compute Architecture of Intel Processor Graphics Gen9, Version 1.0', Aug. 14, 2015 [retrieved on Apr. 12, 2018] . Retrieved from the Internet: <https://software.intel.com/sites/default/files/managed/c5/9a/The-Compute-Architecture-of-Intel-Processor-Graphics-Gen9-v1d0.pdf> (Year: 2015).*

*Primary Examiner* — Aimee Li
*Assistant Examiner* — Shawn Doman
(74) *Attorney, Agent, or Firm* — Potomac Law Group, PLLC; Vincent M DeLuca

(57) ABSTRACT

A method for a plurality of pipelines, each having a processing element having first and second inputs and first and second lines, wherein at least one of the pipelines includes first and second logic operable to select a respective line so that data is received at the first and second inputs respectively. A first mode is selected and for the at least one pipeline, the first and second lines of that pipeline are selected such that the processing element of that pipeline receives data via the first and second lines of that pipeline, the first line being capable of supplying data that is different to the second line. A second mode is selected and for the at least one pipeline a line of another pipeline is selected, the second line of the at least one pipeline is selected and the same data at the second line is supplied as the first line.

20 Claims, 8 Drawing Sheets

(51) Int. Cl.
*G06T 1/20* (2006.01)
*G06F 9/38* (2018.01)
*G06F 7/575* (2006.01)

(52) U.S. Cl.
CPC .......... *G06F 9/3824* (2013.01); *G06F 9/3867* (2013.01); *G06F 9/3869* (2013.01); *G06F 9/3885* (2013.01); *G06F 9/3887* (2013.01); *G06F 15/80* (2013.01); *G06F 15/8007* (2013.01); *G06T 1/20* (2013.01)

(58) Field of Classification Search
CPC ...... G06F 7/575; G06F 9/3887; G06F 9/3824; G06F 15/80; G06F 9/3885; G06F 9/30014; G06F 12/084; G06T 1/20
USPC .................................................. 712/229, 20
See application file for complete search history.

(56) References Cited

U.S. PATENT DOCUMENTS

| | | | |
|---|---|---|---|
| 7,680,988 B1 * | 3/2010 | Nickolls | G06F 12/084 711/149 |
| 2001/0014166 A1 | 8/2001 | Hong | |
| 2005/0030062 A1 * | 2/2005 | Pedersen | H03K 19/1737 326/40 |
| 2007/0182753 A1 * | 8/2007 | Isidoro | G06T 15/04 345/587 |
| 2012/0089812 A1 * | 4/2012 | Smith | G06F 9/4843 712/21 |
| 2016/0085449 A1 | 3/2016 | Arbel et al. | |

* cited by examiner

SELECTION OF DATA FOR PROCESSOR PIPELINES USING MULTIPLE SUPPLY LINES WHEREIN IN ONE OF TWO MODES THE SAME DATA IS SUPPLIED TO BOTH INPUTS OF A PROCESSING ELEMENT

BACKGROUND

This invention relates to supplying data at a processor.

With some types of data, such as graphics data, large blocks of data often need to undergo the same processing operations. One example is when applying a texture to many pixels of a primitive when rendering a 3D scene. Processing such data in parallel can reduce the processing time compared with serial processing. Parallel processing can be carried out on a single instruction multiple thread (SIMT) or single instruction multiple data (SIMD) processor, which are microprocessors with execution units, caches and memories as with any other processor, but additionally incorporates the concept of parallel execution of multiple threads or data streams. SIMT and SIMD processors comprise a plurality of processing elements that can concurrently execute the same instructions. Each processing element supports its own thread and each thread performs the same set of instructions but on different data. A single fetch operation can provide each and all of the threads with their data at the same time. SIMT and SIMD processing can provide improved processing efficiency as compared with traditional single instruction single data (SISD) processing, which generally supports a single thread at a time and so fetches data from memory one thread at a time.

In some applications, parallel processors perform a particular operation on a regular basis. For example, in graphics processing, gradient operations are commonly used to determine the rate of change of a quantity (such as texture coordinate values). In cases where a particular operation is performed regularly enough, it may be desirable to provide an operation-specific optimisation to the architecture of the parallel processor so that the operation can be performed quickly and efficiently. However, in most cases, providing such an optimisation leads to an increase in the chip area due to the additional logic required for that particular optimisation. There is, therefore, a need to optimise a processor for particular operations whilst minimising the cost of providing that optimisation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a processor comprising: a controller configured to select a first mode or a second mode of operation for the processor in dependence on at least one instruction received for processing data at the processor; and a plurality of processing pipelines, wherein each pipeline comprises: a processing element having a first input and a second input; a first supply line and a second supply line; wherein at least one pipeline of the plurality of processing pipelines further comprises: first selection logic operable to select a supply line so that data from the selected supply line is received at the first input via the first selection logic; second selection logic operable to select a supply line so that data from the selected supply line is received at the second input via the second selection logic, wherein in the first mode and for the at least one pipeline, the first and second selection logic are configured to respectively select first and second supply lines of that pipeline such that the processing element of that pipeline receives data via the first and second supply lines of that pipeline, wherein the first supply line is capable of supplying data that is different to the data supplied by the second supply line; wherein, in the second mode and for the at least one pipeline: the first selection logic is configured to select a supply line of another one of the plurality of pipelines; the second selection logic is configured to select the second supply line of the at least one pipeline; and the controller is configured to cause the second supply line of the at least one pipeline to supply the same data as the first supply line of that pipeline.

For each pipeline, the first and second data supply lines may be configured to supply data from private memory for the processing element of that pipeline.

The controller may be configured to select the second mode in response to the at least one instruction comprising an instruction for at least one of the processing elements to process data from private memory for another one of the processing elements.

In the second mode and for the at least one pipeline, the controller may be configured to cause the second supply line to supply data from the same memory register as the first supply line.

In the second mode and for the at least one pipeline, the first selection logic may select one of the supply lines of another one of the plurality of pipelines so as to receive data from private memory for the processing element of the another pipeline.

The controller may be configured to select the second mode when the at least one instruction received for processing data at the processor is a gradient operation.

The gradient operation may be for determining the gradient between at least two pixel positions.

The controller may be configured to select the second mode when the at least one instruction received for processing data at the processor is a maximum operation.

The maximum operation may be for determining the maximum value of at least two pixel positions.

The controller may be configured to select the second mode when the at least one instruction received for processing data at the processor is an averaging operation.

The averaging operation may be for determining an average value of at least two pixel positions.

The processor may comprise more than two processing pipelines and, in the second mode, each of the first and second selection logic of one of the processing pipelines may be capable of selecting a supply line of the other processing pipelines.

Each processing element may be a fused multiply-add arithmetic logic unit.

The processor may comprise four processing pipelines and each of the first and second selection logic may have no more than four selectable inputs.

The processor may be capable of concurrently supporting a plurality of threads.

The processor may be a single instruction multiple thread (SIMT) or single instruction multiple data (SIMD) processor.

The processor may be a graphics processing unit (GPU).

According to a second aspect of the present invention there is provided a method of processing data at a processor comprising a plurality of pipelines, each pipeline comprising: a processing element having a first input and a second input; and a first supply line and a second supply line, wherein at least one pipeline of the plurality of processing pipelines further comprises: first selection logic operable to select a supply line so that data from the selected supply line is received at the first input via the first selection logic; and second selection logic operable to select a supply line so that data from the selected supply line is received at the second input via the second selection logic, the method comprising: receiving at least one instruction for processing data; selecting a first mode or a second mode of operation for the processor in dependence on the at least one instruction; if the first mode is selected and for the at least one pipeline: selecting, by the first and second selection logic respectively, the first and second supply lines of that pipeline such that the processing element of that pipeline receives data via the first and second supply lines of that pipeline, wherein the first supply line is capable of supplying data that is different to the data supplied by the second supply line; if the second mode is selected and for the at least one pipeline: selecting, by the first selection logic, a supply line of another one of the plurality of pipelines; selecting, by the second selection logic, the second supply line of the at least one pipeline; and supplying the same data at the second supply line of the at least one pipeline as the first supply line of that pipeline.

For each pipeline, the step of supplying the same data may comprise supplying data from private memory for the processing element of that pipeline.

The second mode may be selected in response to the at least one instruction comprising an instruction for at least one of the processing element to process data from private memory for another one of the processing elements.

For the at least one pipeline, the step of supplying the same data may comprise supplying data from the same memory register to the first and second supply lines.

In the second mode and for the at least one pipeline, the first selection logic may select one of the supply lines of another one of the plurality of pipelines so as to receive data from private memory for the processing element of the another pipeline.

The second mode may be selected when the at least one instruction received for processing data at the processor is a gradient operation.

The gradient operation may be for determining the gradient between at least two pixel positions.

The second mode may be selected when the at least one instruction received for processing data at the processor is a maximum operation.

The maximum operation may be for determining the maximum value of at least two pixel positions.

The second mode may be selected when the at least one instruction received for processing data at the processor is an averaging operation.

The averaging operation may be for determining an average value of at least two pixel positions.

The processor may comprise more than two processing pipelines and, in the second mode, each of the first and second selection logic of one of the processing pipelines may be capable of selecting a supply line of the other processing pipelines.

Each processing element may be a fused multiply-add arithmetic logic unit.

The processor may comprise four processing pipelines and each of the first and second selection logic have no more than four selectable inputs.

The processor may be capable of concurrently supporting a plurality of threads.

The processor may be a single instruction multiple thread (SIMT) or single instruction multiple data (SIMD) processor.

The processor may be a graphics processing unit (GPU).

The processor may be embodied in hardware on an integrated circuit. There may be provided a method of manufacturing, at an integrated circuit manufacturing system, the processor. There may be provided an integrated circuit definition dataset that, when processed in an integrated circuit manufacturing system, configures the system to manufacture the processor. There may be provided a non-transitory computer readable storage medium having stored thereon a computer readable description of an integrated circuit that, when processed in an integrated circuit manufacturing system, causes the integrated circuit manufacturing system to manufacture the processor.

There may be provided an integrated circuit manufacturing system comprising: a non-transitory computer readable storage medium having stored thereon a computer readable integrated circuit description that describes the processor; a layout processing system configured to process the integrated circuit description so as to generate a circuit layout description of an integrated circuit embodying the processor; and an integrated circuit generation system configured to manufacture the processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS examples will now be described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Figure 1:
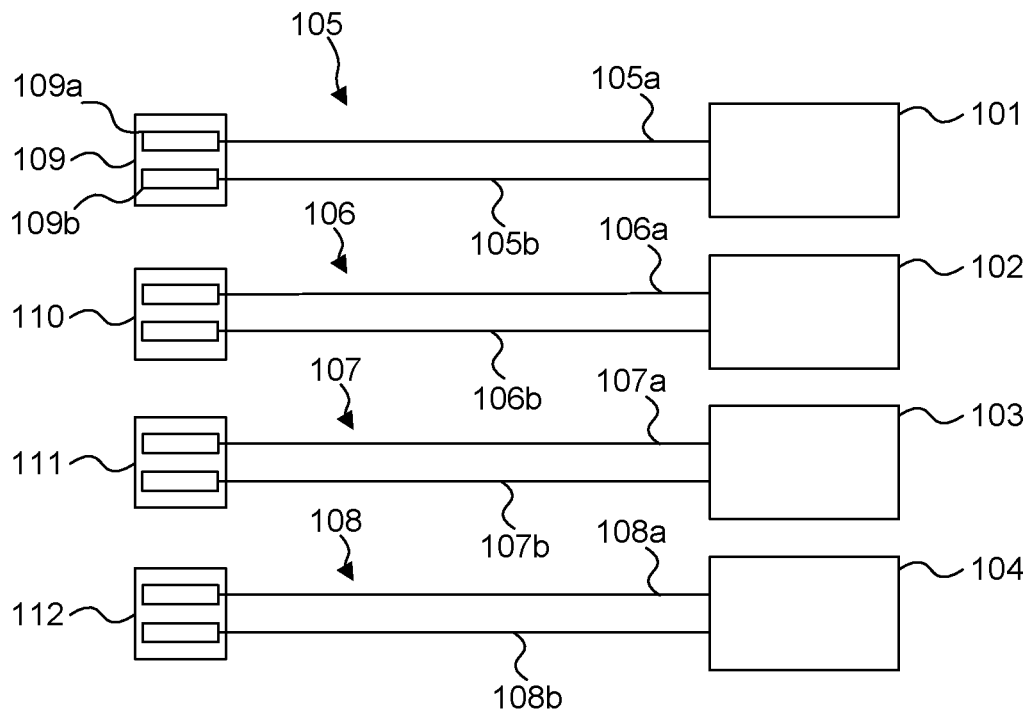
FIG. 1 shows a simplified schematic of a parallel processor.

FIG. 1 shows a simplified schematic of a parallel processor 100, which comprises a plurality of processing elements. In this example, the processor 100 is shown as having four processing elements 101-104 but it could have less than four (but at least two) processing elements or more than four processing elements. The processing elements may be arithmetic logic units (ALUs) that perform arithmetic on incoming operands. Each of the processing elements may have two or more inputs for receiving operands to perform a calculation on. Each processing element may include a fused multiply-add (FMA) unit. In general, an FMA unit can perform an operation on three incoming operands to first multiply two of the operands and then accumulate the product with the third operand. More specifically, an FMA ALU is designed to compute A*B+C, where A, B and C are arbitrary values. Typically, A is called the multiplier input, B is called the multiplicand input, and C is called the addend input. Each processing element may comprise other units for performing particular mathematical operations. For example, if a processing element is required to perform subtraction (as described in the examples below), the processing element may comprise a negation unit at one or more particular inputs for negation of the values at those inputs. In FIG. 1, each processing element is shown as having two inputs as only two inputs are required for the subtraction operations described in the examples below. However, each processing unit may have more than two inputs.

As shown, each of the processing elements 101-104 are connected to, at their inputs, a respective set of data supply lines 105-108. Each set 105-108 has a first supply line 105a-108a and a second supply line 105b-108b respectively. Each processing element 101-104 is able to read data from memory (e.g., registers) via its set of supply lines 105-108 respectively. Each processing element may be allocated a particular region of memory which it accesses to receive data from (via its data supply lines). A region of memory for each processing element may be allocated on a per-thread or per-work-item basis (the terms "work-item" and "thread" are used interchangeably herein). That region of memory may be fast register based storage that is provided on-chip and close to the processing element. In frameworks such as OpenCL, the region of memory that is allocated on a per-thread or per-work-item basis is usually referred to as "private memory". In other frameworks such as CUDA, this region of memory is usually referred to as "local memory" (hereinafter the term "private memory" only is used for simplicity but can also refer to CUDA's "local memory"). At processor 100, each work-item is allocated a private memory and processed at one of the processing elements 101-104. Variables defined in one work-item's private memory are not visible to another work-item and so a processing element cannot usually access another processing element's private memory. Thus, private memory 109 is private to processing element 101, private memory 110 is private to processing element 102, and so on. A processing element, its private memory and its data supply lines may be considered to form a part of the processing pipeline for that processing element.

In operation, processing element 101 can receive data from private memory 109 via supply lines 105a and 105b to perform processing on. As mentioned above, the processing element may be an ALU, which may perform an arithmetic operation on the data received at the ALU. For example, the arithmetic operation may be to subtract a value stored in register 109a from a value stored in register 109b. In the case that the ALU comprises an FMA, the multiplier input A may be the value from register 109b and the addend input C may be the value from register 109a which is made negative (e.g., by a negation unit provided in processing element 101 between the processing element's input for line 105a and the FMA). The multiplicand input B may be set to 1.

Processing element 101 accesses each of the registers 109a and 109b to read the values and execute the arithmetic operation. The result is then outputted back to memory and may be processed further. The reading and execution is also performed in parallel by the other processing elements 102-104 for other data. That is, processing elements 101-104 can execute the same instructions but on different data during the same cycle.

In graphics processing, certain operations are commonly performed. For example, a graphics processor may regularly determine an average of a number of pixels (e.g., for image filtering, such as preparing the levels of a MIP-map). As mentioned above, other commonly performed operations in graphics processing are gradient operations, which are used to determine the rate of change of a quantity (such as texture coordinate values). In the following description, gradient operations are used as an example of an operation that could be optimised for a parallel processor, such as the processor of FIG. 1. However, it will be appreciated that the processor could be optimised in a similar manner for other operations such as providing an average or a maximum value of a group of pixels.

Figure 2:
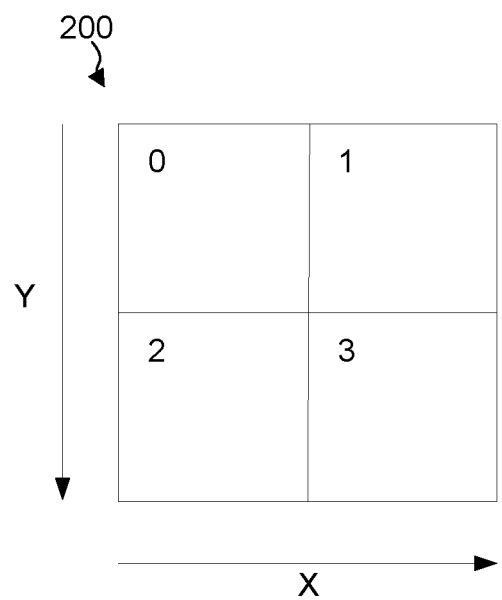
FIG. 2 shows an example of a group of pixels in a 2×2 pixel block.

A graphics processor may process groups of pixels in parallel. For example, a processor (such as the processor of FIG. 1) with four processing elements may process a group of four pixels in parallel; each pixel being processed by a respective one of the four processing elements. For example, the group of pixels may be processed to perform shading on each pixel in parallel. FIG. 2 shows an example of a group of pixels in a 2×2 pixel block 200, which comprises pixel positions 0, 1, 2 and 3. When the group of pixels are being processed, each processing element executes the same instructions at the same time but on the different data for each pixel position. On occasions, gradient operations may also need to be performed on the group of pixels being processed. This may be done by evaluating a value associated with each of the pixel positions and then subtracting values associated with adjacent pixel positions to give the gradient (i.e., the rate of change) in the x or y direction, e.g., if the values associated with pixel positions represent an attribute 'u', du/dx and du/dy respectively. In some graphics processing applications, it can be useful to provide a coarse estimate of the x and y gradients and/or a finer estimate of the gradients. A coarse estimate of the x or y gradient for all pixels in a 2×2 pixel block may be provided by calculating the gradient for one pair of horizontally or vertically adjacent pixels respectively (e.g., as shown by the gradient vectors for pixel block 200 in FIGS. 5A and 5B respectively). For example, the gradient between pixels 0 and 1 may provide a coarse estimate of the x gradient for the 2×2 block and the gradient between pixels 0 and 2 may provide a coarse estimate of the y gradient for the 2×2 block. In this way, the same resultant coarse estimate of the gradient can be associated with each of pixels 0 to 4.

Figure 5A:
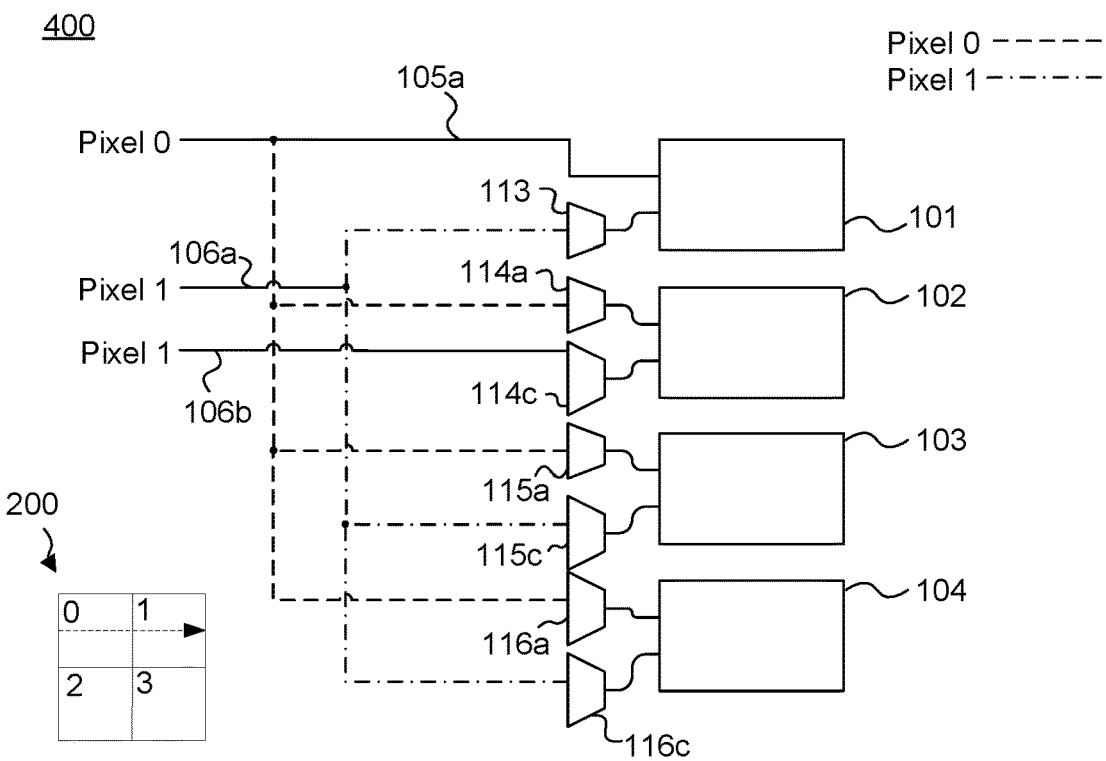
FIG. 5A shows an example of the routing used for a first operation.
Figure 5B:
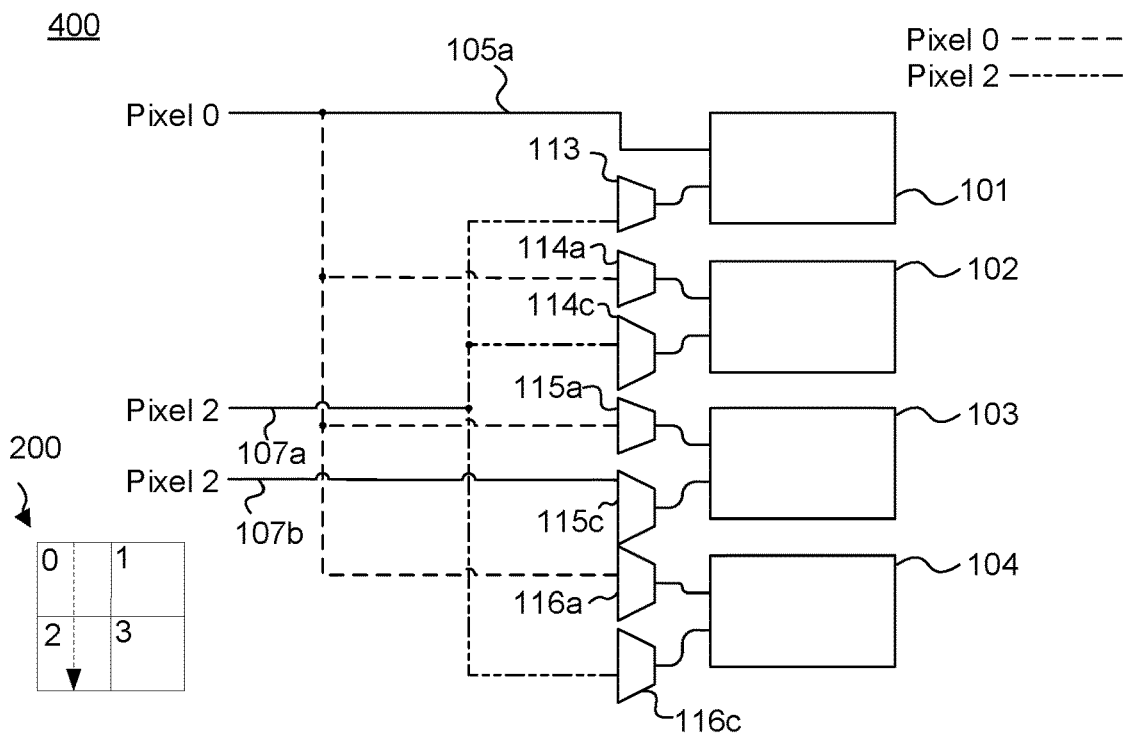
FIG. 5B shows an example of the routing used for a second operation.
Figure 5C:
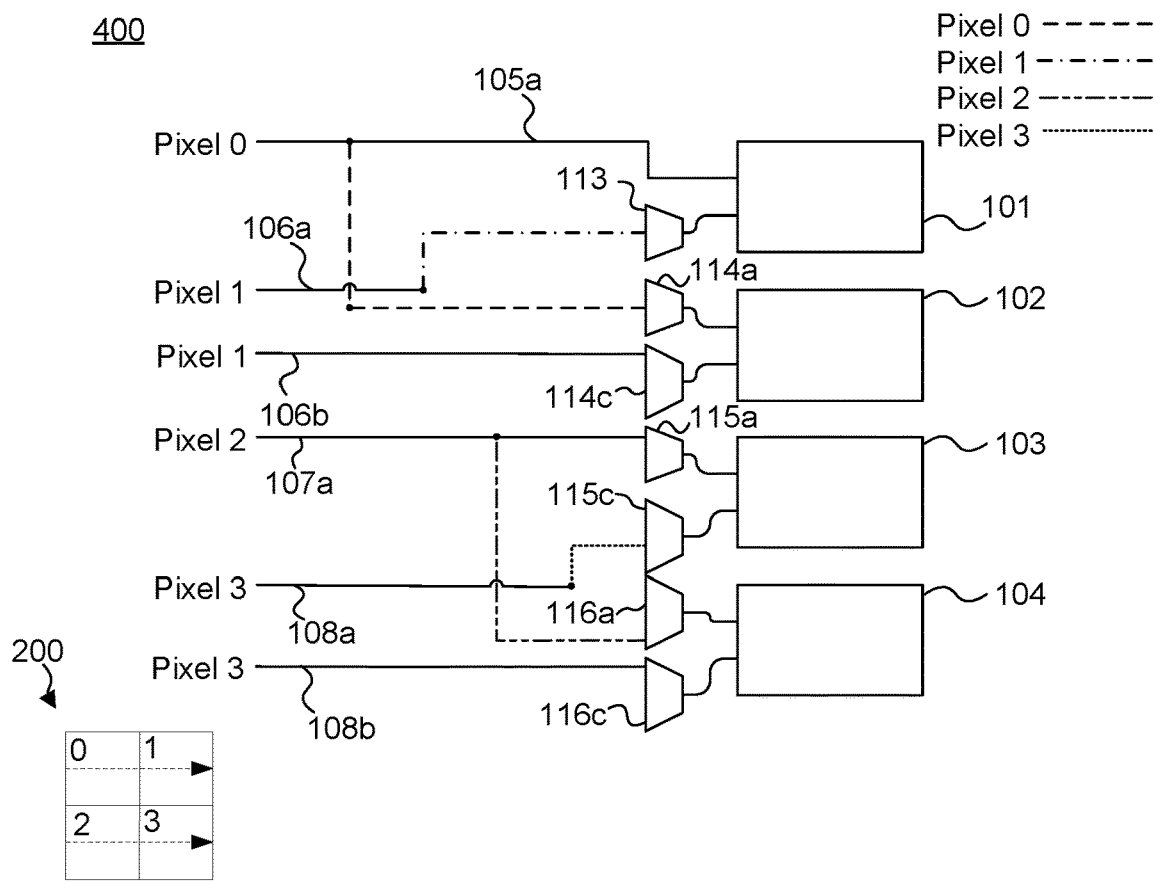
FIG. 5C shows an example of the routing used for a third operation.

The gradient can be calculated at a finer granularity than the 2×2 block, and separate dx gradients can be calculated for pixels 0 and 1 and for pixels 2 and 3 (e.g., as shown by the gradient vectors for pixel block 200 in FIG. 5C). Similarly, the gradient can be calculated at a finer granularity in the y direction and separate dy gradients can be calculated for pixels 0 and 2 and for pixels 1 and 3 (e.g., as shown by the gradient vectors for pixel block 200 in FIG. 5D).

The performance of a gradient operation at the parallel processor of FIG. 1 (which does not have the gradient operation optimisations described below) is now described. In this example, processing elements 101-104 each run a thread to perform SIMD processing on a corresponding one of the four data items from a 2×2 pixel block. As specified by some graphics standards, it may be required that the same coarse x gradient be calculated at each of the pixel positions in the same 2×2 pixel block. In this case, the values for pixels 0 and 1 are read from main memory and placed into data registers at each of the private memories 109-112 so that each of the processing elements 101-104 can read those values and perform the gradient calculation on those values. Each of the values calculated by the processing elements are then written to a memory register in the private memory for the respective thread. Each thread may then require another gradient calculation to be performed for the same 2×2 pixel block, such as a fine y gradient, which requires a gradient for positions 0 and 2 to be calculated between pixels 0 and 2 and a gradient for positions 1 and 3 to be calculated between pixels 1 and 3. The pixel values for all four pixels 0-3 may then need to be placed at each of the private memories 109-112 according to the particular gradient calculations that the threads are required to calculate. Thus, for such gradient operations, each of the private memories 109-112 are required to hold copies of pixel values for other pixels. Providing the same data at more than one of the private memories may be considered to be an inefficient use of the available memory.

Figure 3A:
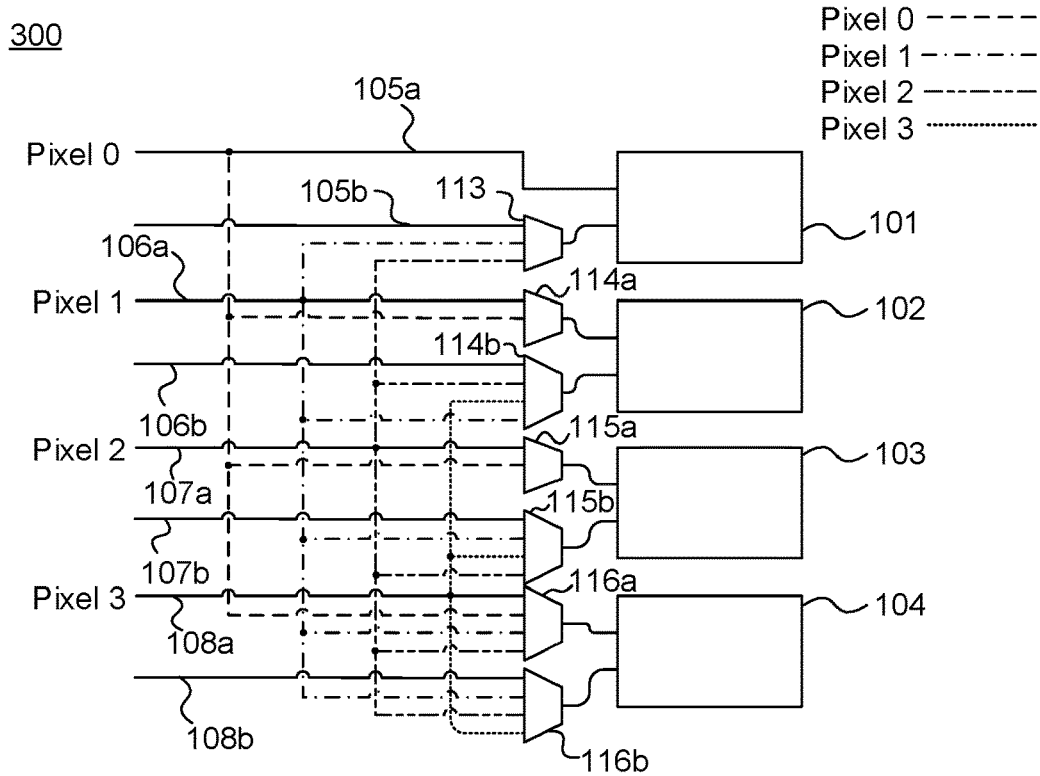
FIG. 3A shows a processor with routing and selection logic.

An optimisation for performing gradient operations at processor 100 may be provided by introducing additional routing and selection logic, as shown in FIG. 3A to provide processor 300. In FIG. 3A, the solid lines represent the conventional data supply lines that are used normally by the processor and the broken lines represent the additional routing and logic which can be used when performing gradient operations in the optimised manner. In this arrangement, each of the private memories (not shown for clarity purposes) is provided with one of the pixel values from the 2×2 pixel block. For example, the private memory for processing element 101 is provided with the value for pixel 0 at one of its registers, the private memory for processing element 102 is provided with the value for pixel 1 at one of its registers, the private memory for processing element 103 is provided with the value of pixel 2 at one of its registers and the private memory for processing element 104 is provided with the value of pixel 3 at one of its registers. Thus, when operating in the optimised manner, a single pixel value is provided to each private memory rather than all of the pixel values being provided to all of the private memories when operating in the non-optimised manner. As shown in FIG. 3A, the data supply lines 105a-108a supply the values of pixels 0-3 respectively and so data supply lines 105b, 106b, 107b and 108b are not required to supply any data.

Figure 9:
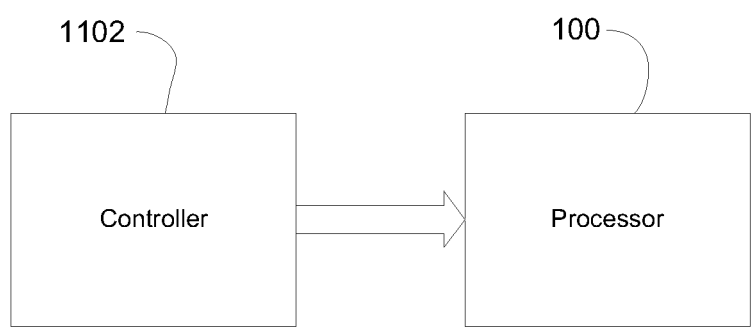
FIG. 9 is a block diagram showing a controller connected to a processor.

Selection logic such as a multiplexer (as shown in FIG. 3a) is provided at each of the inputs of each processing element. As mentioned above, a processing pipeline for a processing element may be considered to be the private memory allocated to the processing element, the supply lines that supply data from that private memory and that processing element. In this example, the multiplexers coupled to the inputs of a processing element also form part of its processing pipeline. As described below, the multiplexers allow a processing element to receive data from the pipelines of other processing elements. When a gradient operation is required to be performed, a controller (such as controller 1102 shown in FIG. 9) may cause each of the multiplexers to select the appropriate supply line that routes the relevant pixel values to each of the processing elements, which then performs that calculation.

Figure 3B:
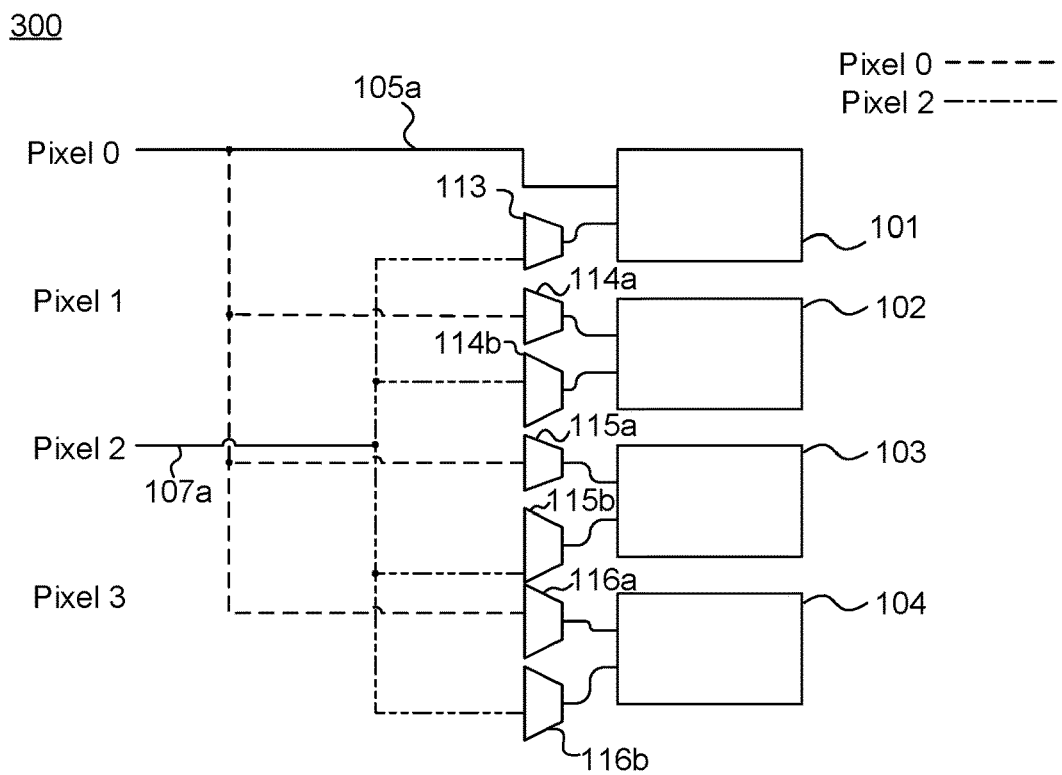
FIG. 3B shows an example of the routing used for a particular operation.

As shown in FIG. 3A, the top input of processing element 101 receives data supply line 105a. Multiplexer 113 is provided at the bottom input of processing element 101. As shown, multiplexer 113 receives supply line 105b, a line (represented by a dot-dash line) coupled to supply line 106a for the pixel 1 value and a line (represented by a long dash-double short dash line) coupled to supply line 107a for the pixel 2 value. When performing a gradient calculation for pixels 0 and 1, line 105a supplies the pixel 0 value and multiplexer 113 selects the line coupled to supply line 106a for the pixel 1 value. When performing a gradient calculation for pixels 0 and 2, line 105a supplies the pixel 0 value and multiplexer 113 will select the line coupled to supply line 107a for the pixel 2 value. Processing unit 101 can therefore receive data from its own private memory and from the private memory of processing units 102 and 103. The multiplexers of the processing elements 102-104 may also select lines to receive data from the private memories of other processing element in a similar manner. FIG. 3B shows an example where each of the processing elements is required to determine the gradient in the y direction for pixels 0 and 2. In this figure, the lines that are selected by the multiplexers are shown and the lines that are not selected have been removed from the figure for clarity.

When a different gradient is required be calculated for the same 2×2 pixel block, the controller can re-select the lines which provide the processing elements with new pixel values for the new calculation. Thus, the pixel values at the private memories do not need to be changed (as they would have had to for the arrangement shown in FIG. 1) because the selection and control logic routes the required pixel values to each processing element.

FIGS. 3A and 3B are one example of how selection and control logic could be provided to a processor to optimise the performance of a specific set of gradient calculations. Optimisations for other calculations may require different selection and control logic.

The operation-specific optimisation provided to a processor by selection and control logic may be improved further by supplying the same data twice at each pipeline. As an example, FIG. 4 demonstrates how supplying the same data twice can lead to an improvement in the control and selection logic of FIG. 3A.

Figure 4:
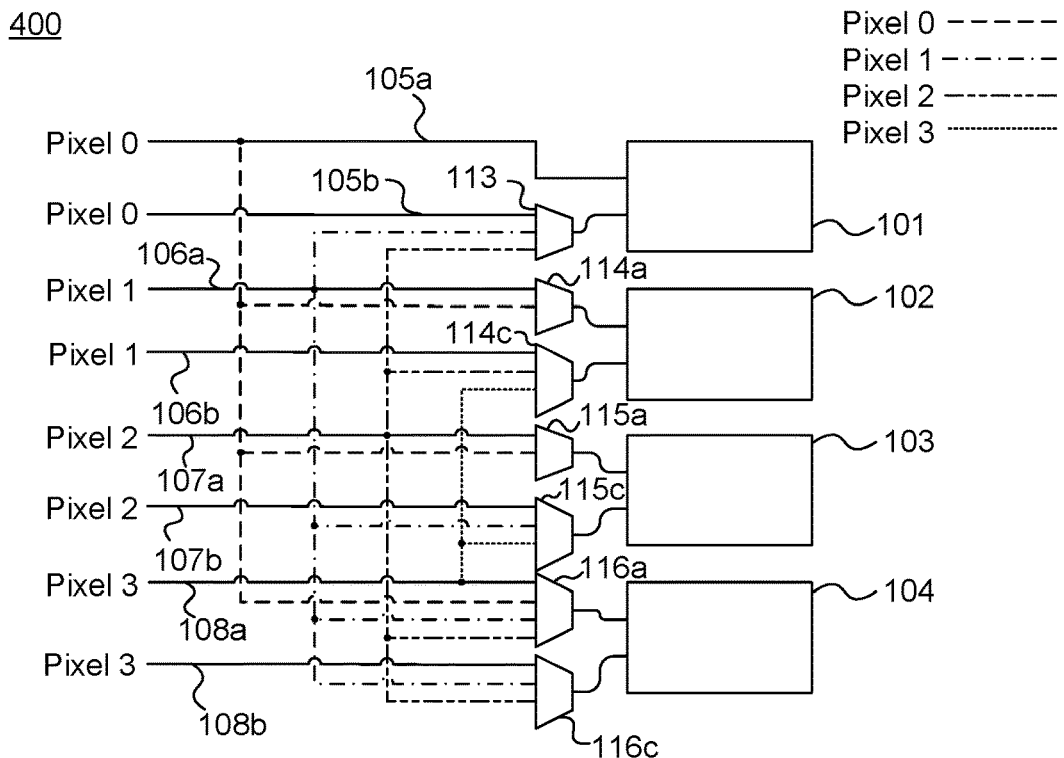
FIG. 4 shows a processor with different routing and selection logic.

As shown in FIG. 4, by supplying the same data on both supply lines of a pipeline, the size of multiplexers 114b, 115b and 116b of FIG. 3 can be reduced to instead provide multiplexers 114c, 115c and 116c, which each require one less supply line to be provided at their input. Providing multiplexers with fewer inputs reduces the chip area required to provide the multiplexers. Furthermore, the improved arrangement also reduces the propagation delay through some paths of the multiplexing, which increases that amount of available time for performing logical or arithmetical operations. This in turn allows for further area reductions due to the looser timing constraints in the processing elements themselves.

Figure 5D:
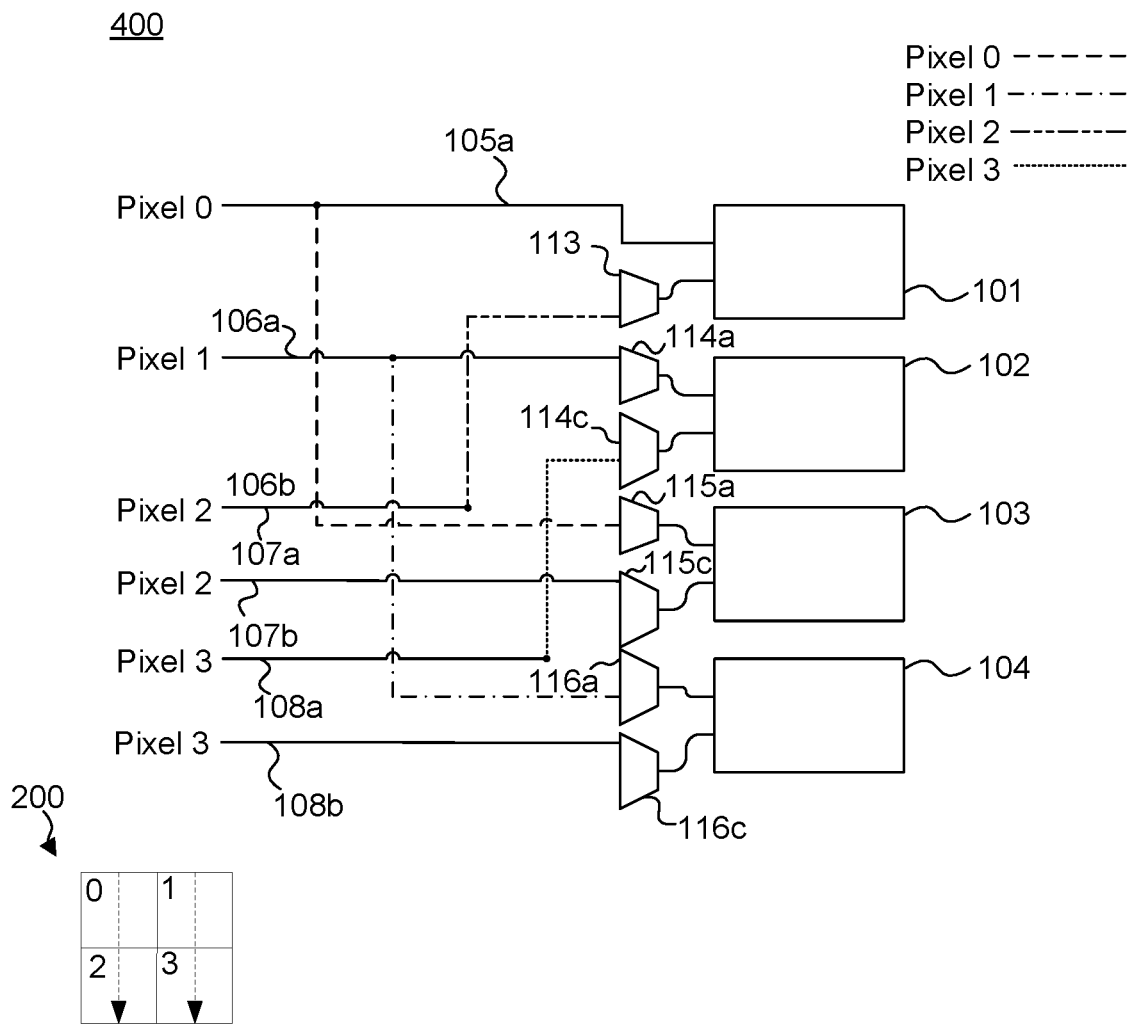
FIG. 5D shows an example of the routing used for a fourth operation.

In FIGS. 4 to 5D, each multiplexer shown at that top of each pipeline (e.g., multiplexers 114a, 115a and 116a) may be referred to as the "first selection logic" herein and each multiplexer shown at the bottom of each pipeline (e.g., multiplexers 113, 114c, 115c and 116c) may be referred to as the "second selection logic" herein.

Similar to processor 300 of FIG. 3A, processor 400 of FIG. 4 may operate in a first mode where it can be used as a general purpose parallel processor (for example, to change the brightness of pixels in image) and may operate in a similar manner to processor 100, as described above. Processor 400 may operate in a second mode where it is used for a specific operation. The specific operation may be gradient operations, as discussed above. However, processors optimised for other specific operations may be provided, as discussed further below. A controller (not shown) may select the mode of operation for processor 400. The selection may be dependent on the processing that is required to be carried out by the processor, which may be determined by the instructions that need to be executed. For example, if the processing required to be performed is for the specific operation that the processor is optimised for, then the controller may select the second mode. For the processing of other, non-optimised operations, the controller may select the general purpose mode (i.e. the first mode). The processor is capable of rapidly changing between the first and second modes and the modes can change according to the instruction being executed. For example, a program may have a sequence of instructions, a small number of which are gradient calculations. The processor can switch from the first mode to the second mode whenever a gradient instruction is executed, and return to the first mode whenever another type of instruction is executing without ever interrupting the flow of instruction execution.

In the general purpose mode, a controller connected to each of the multiplexers (not shown for simplicity), causes each multiplexer to select the supply line that is part of the same pipeline as that multiplexer. That is, each multiplexer selects the supply line that supplies data from the private memory allocated to the processing element that the multiplexer outputs data to. For example, multiplexer 113 selects line 105b, multiplexer 114a selects line 106a, multiplexer 114c selects line 114b, and so on. In the general purpose mode, the processor operates in a similar manner to that described above in relation to FIG. 1, wherein each processing element can only read data from the private memory that is allocated to the thread running on that processing element. In the general purpose mode, each supply line is able to supply data that is different to the data supplied by the other supply lines of the same pipeline, as described above.

When the processor switches to operate in the second mode, the processor may be configured such that, for at least one of the pipelines, the supply lines that are in the same pipeline supply the same data. In other words, the supply lines in the same pipeline may supply the same data at the same time. In one example, the supply lines in the same pipeline may supply the same data by causing each of those supply lines to read data from the same memory register. In another example, the supply lines in the same pipeline may supply the same data by copying the relevant data to each of the registers that supply data to each of those data supply lines. In the gradient operation example, supply lines 106a and 106b may both supply the same pixel 1 data, supply lines 107a and 107b may both supply the same pixel 2 data and supply lines 108a and 108b may both supply the same pixel 3 data. Thus, for at least one of the processing pipelines, each pixel value may be supplied twice by the supply lines of each processing pipeline.

In the second mode, the controller also causes each multiplexer to select an appropriate supply line to route the required data to the processing element input that the multiplexer is connected to. In the second mode, the controller is capable of causing multiplexers 114c, 115c and 116c to select supply lines 106b, 107b and 108b respectively which supply the same data as supply lines 106a, 107a and 108a respectively. As shown, multiplexers 114c, 115c and 116c of FIG. 4 each require one fewer input than the corresponding multiplexers of FIG. 3 (i.e., multiplexers 114b, 115b and 116b respectively) to perform the same calculations as the FIG. 3 processor 300. This allows the multiplexers to be more compact, which provides a chip area saving that is significant, especially for processors that have a large number of processing elements.

FIGS. 5A and 5B show the lines that are selected for calculating coarse x and y gradients respectively. FIGS. 5C and 5D show the lines that are selected for calculating fine x and y gradients respectively. The lines that are not selected have been removed from the figures to aid clarity. Table 1 shows the pixel position data received at each processing element and the calculations performed for the course x and y and fine x and y gradients for pixel block 200.

TABLE 1

| Gradient | Processing element | Pixel position data required | Calculation performed on pixel position data |
|---|---|---|---|
| Coarse x | 101 | 0, 1 | 1-0 |
| Coarse x | 102 | 0, 1 | 1-0 |
| Coarse x | 103 | 0, 1 | 1-0 |
| Coarse x | 104 | 0, 1 | 1-0 |
| Coarse y | 101 | 0, 2 | 2-0 |
| Coarse y | 102 | 0, 2 | 2-0 |
| Coarse y | 103 | 0, 2 | 2-0 |
| Coarse y | 104 | 0, 2 | 2-0 |
| Fine x | 101 | 0, 1 | 1-0 |
| Fine x | 102 | 0, 1 | 1-0 |
| Fine x | 103 | 2, 3 | 3-2 |
| Fine x | 104 | 2, 3 | 3-2 |
| Fine y | 101 | 0, 2 | 2-0 |
| Fine y | 102 | 1, 3 | 3-1 |
| Fine y | 103 | 0, 2 | 2-0 |
| Fine y | 104 | 1, 3 | 3-1 |

In the FIG. 5A example, each of the processing elements receive pixel 0 and pixel 1 data to perform the coarse x gradient operation (which is depicted by the arrow shown in pixel block 200). As shown, in the processing pipeline for processing element 101, line 105a provides pixel 0 data directly to the processing element 101 and multiplexer 113 selects a line connected to line 106a to receive pixel 1 data. In the processing pipeline for processing element 102, multiplexer 114a receives pixel 0 data from a line connected to line 105a and multiplexer 114c receives duplicate pixel 1 data directly from line 106b. In contrast, in the FIG. 3 example, multiplexer 114b receives pixel 1 data from an additional line that is connected to line 106a. Thus, multiplexer 114c has one fewer line at its input than multiplexer 114b and so multiplexer 114c can be smaller. The remaining pipelines receive pixel 0 and pixel 1 data from lines connected to supply lines 105a and 106a respectively.

Similarly, FIG. 5B shows the lines that the multiplexers select in order to receive pixel 0 and pixel 2 data so that each of the processing elements can perform the coarse y gradient operation (which is depicted by the arrow shown in pixel block 200). As shown, multiplexer 115c receives duplicate pixel 2 data directly from line 107b. In contrast, in the FIG. 3 example, multiplexer 115b receives pixel 2 data from an additional line that is connected to line 107a. Thus, multiplexer 115c has one fewer line at its input than multiplexer 115b and so multiplexer 115c can be smaller.

FIG. 5C shows the lines that the multiplexers for processing elements 101 and 102 select in order to receive pixel 0 and pixel 1 data and the lines that the multiplexers for processing elements 103 and 104 select in order to receive pixel 2 and pixel 3 data so that the processor can perform the fine x gradient operation (which is depicted by the arrows shown in pixel block 200). For this operation, two processing elements determine the gradient between pixel 0 and pixel 1 and two other processing elements determine the gradient between pixel 2 and pixel 3. As described above in relation to FIG. 5A, multiplexer 114c selects line 106b to receive the duplicate pixel 1 data to perform the gradient determination between pixel 0 and pixel 1 at processing element 102. Furthermore, multiplexer 116c selects line 108b to directly receive the duplicate pixel 3 data so that processing element 104 can determine the gradient between pixel 2 and pixel 3. In contrast, in the FIG. 3 example, multiplexer 116b selects a line connected to supply line 108a to receive pixel 3 data. Thus, by providing duplicate data at line 108b, one fewer line is required at multiplexer 116c compared to multiplexer 116b.

FIG. 5D shows the lines that the multiplexers for processing elements 101 and 103 select in order to receive pixel 0 and pixel 2 data and the lines that the multiplexers for processing elements 102 and 104 select in order to receive pixel 1 and pixel 3 data so that the processor can perform the fine y gradient operation (which is depicted by the arrows shown in pixel block 200). For this operation, two processing elements determine the gradient between pixel 0 and pixel 2 and two other processing elements determine the gradient between pixel 1 and pixel 3. As described above in relation to FIG. 5B, multiplexer 115c selects line 107b to receive the duplicate pixel 2 data to perform the gradient determination between pixel 0 and pixel 2 at processing element 103. Furthermore, similarly to FIG. 5C, multiplexer 116c selects line 108b to directly receive the duplicate pixel 3 data so that processing element 104 can determine the gradient between pixel 1 and pixel 3 so that one fewer line is required at multiplexer 116c compared to multiplexer 116b.

As shown in the examples of FIG. 5A-D, it can be seen that when a processing element requires pixel data from its own processing pipeline at its bottom input, the second mode of operation makes use of the fact that the first mode of operation (i.e., the general purpose mode) already requires the bottom supply line of the pipeline to be connected to the bottom multiplexer of the pipeline for the bottom input. By replicating the value on the bottom supply line, the value can be supplied without needing an input to the bottom multiplexer of the pipeline to select that value from the first supply line.

Therefore, the above example demonstrates how supplying the same data twice to a processing pipeline allows a reduction in the multiplexing hardware used in parallel processors.

Figure 6:
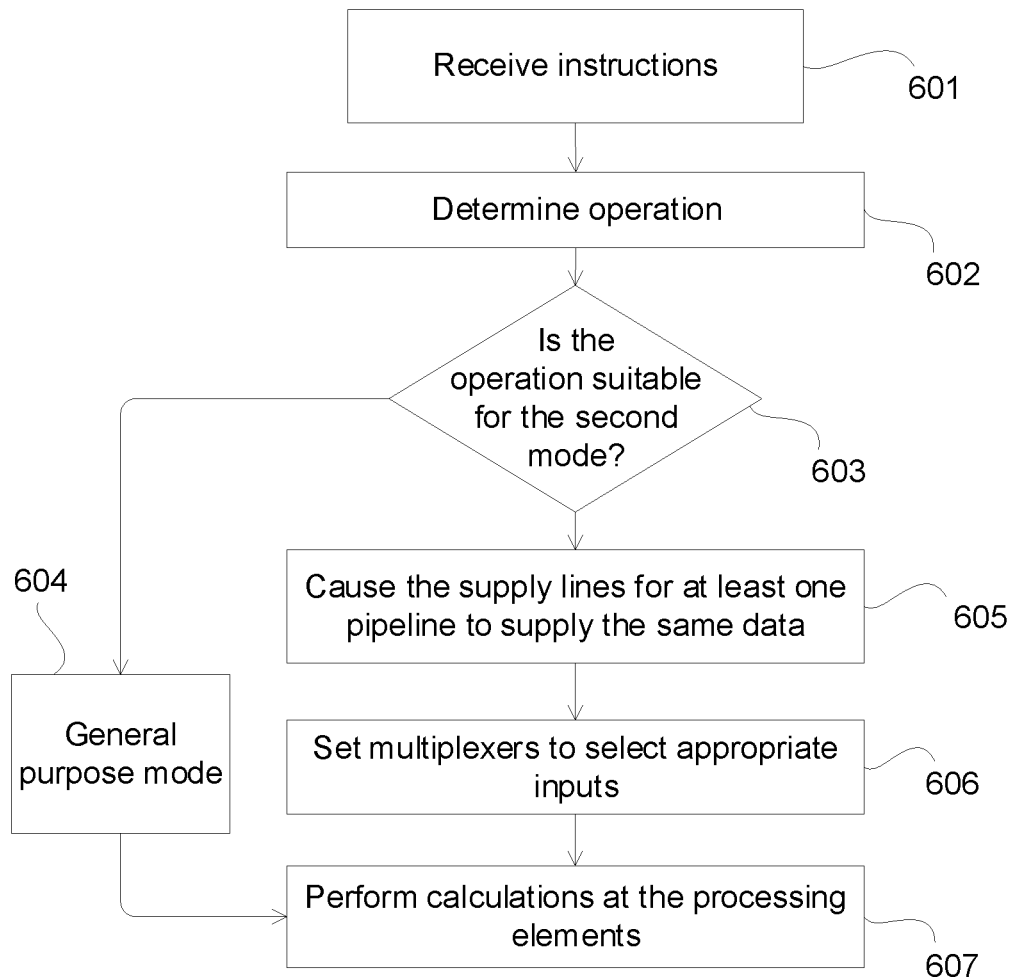
FIG. 6 shows a flow diagram for processing instructions at a parallel processor.

FIG. 6 shows a flow diagram for processing instructions at a parallel processor capable of operating in a first mode (such as a general purpose mode) and a second mode (such as an operation specific mode), as described herein. At step 601, instructions are received that are to be executed by the processor (e.g. processor 400). At step 602, the operation that is performed by the instructions is determined (e.g., by a controller). For example, the operation may be a gradient operation, a maximum value operation or an averaging operation. The processor is provided with selection and control logic that allows the processor to perform one or more operations in a manner that is more efficient than performing those operations in the usual manner (i.e., in the general purpose mode). At step 603, it is determined (e.g., by the controller) if the operation determined at step 602 is one of the operations that the processor is capable of processing efficiently in the second mode. If so, then the process moves on to step 605. If not, then the process moves onto step 604, where the processor maintains operating in the general purpose mode (if it is already operating in that mode) or switches to the general purpose mode (if it was operating in the second mode). The data to be processed is provided from private memory and read by processing elements in the usual manner (e.g., as described in relation to FIG. 1). At step 607, the processing elements perform the calculations on the data as required by the instructions. The process may be repeated for new instructions.

If, at step 603, it is determined that the operation is suitable for being processed in the second mode, the controller configures the processor to operate in the second mode by performing steps 605 and 606. At step 605, the controller causes, for the appropriate pipelines, the supply lines to supply the same data. In other words, the controller causes at least one of the pipelines to supply the same data twice at the same time, as described above. At step 606, each multiplexer at each processing element input is set to select a supply line that provides it's processing element with the data that is required to be processed by that processing element. Either of steps 605 and 606 could be performed in software during compilation of the instructions. In an example implementation, step 605 is performed in compiler that compiles the instructions and step 606 is performed in hardware by the processor.

At step 607, the processing elements perform the required mathematical function on the supplied data, as required by the instruction. Some operations may require more than one calculation to be performed by the processing elements on the supplied data. For example, if an average of two pixel values is to be calculated at an FMA ALU, the two pixel values would first have to be added together and the result would then have to be divided by two. The averaging operation may involve two instructions: an addition (ADD) instruction followed by a division (DIV) instruction. The ADD instruction could be performed in the second mode because it shares data with neighbouring pipelines and the DIV instructions could be performed in the first, general purpose mode.

The examples described above are in relation to performing gradient operations which require a pixel value to be subtracted from another pixel value where one of those pixel values for at least one of the pipelines is supplied as duplicated data. The supply of duplicated data to pipelines can also be used to perform other operations. For example, it may be useful to perform a maximum operation such as determining a maximum pixel value for a group of pixels. In another example, it may be useful to perform an averaging operation such as determining an average pixel value for a group of pixels (e.g., for MIP-mapping). For example, the maximum of the 2×2 pixel block could be determined by first determining the maximum for pixels 0 and 1 and the maximum for pixels 2 and 3, e.g., using the supply line selections shown in FIG. 5C. The maximum for pixels 0 and 1 is determined by processing elements 101 and 102 and provided back to their respective private memories. The maximum for pixels 2 and 3 are determined by processing elements 103 and 104 and provided back to their respective private memories. The processor may then select the supply lines shown in FIG. 5B so that each of the processing elements 101-104 is able to receive the calculated maximum value provided to the private memory of processing element 101 (which is the maximum value of pixels 0 and 1) and receive the calculated maximum value provided to the private memory of processing element 103 (which is the maximum value of pixels 2 and 3). Each processing element is then able to calculate the maximum of those two maximum values to provide the maximum value for the 2×2 pixel block. The average of the 2×2 pixel block may be calculated in a similar manner but by adding pixel values 0 and 1 and adding pixels 2 and 3, adding the resulting values and then dividing that by four.

Figure 7:
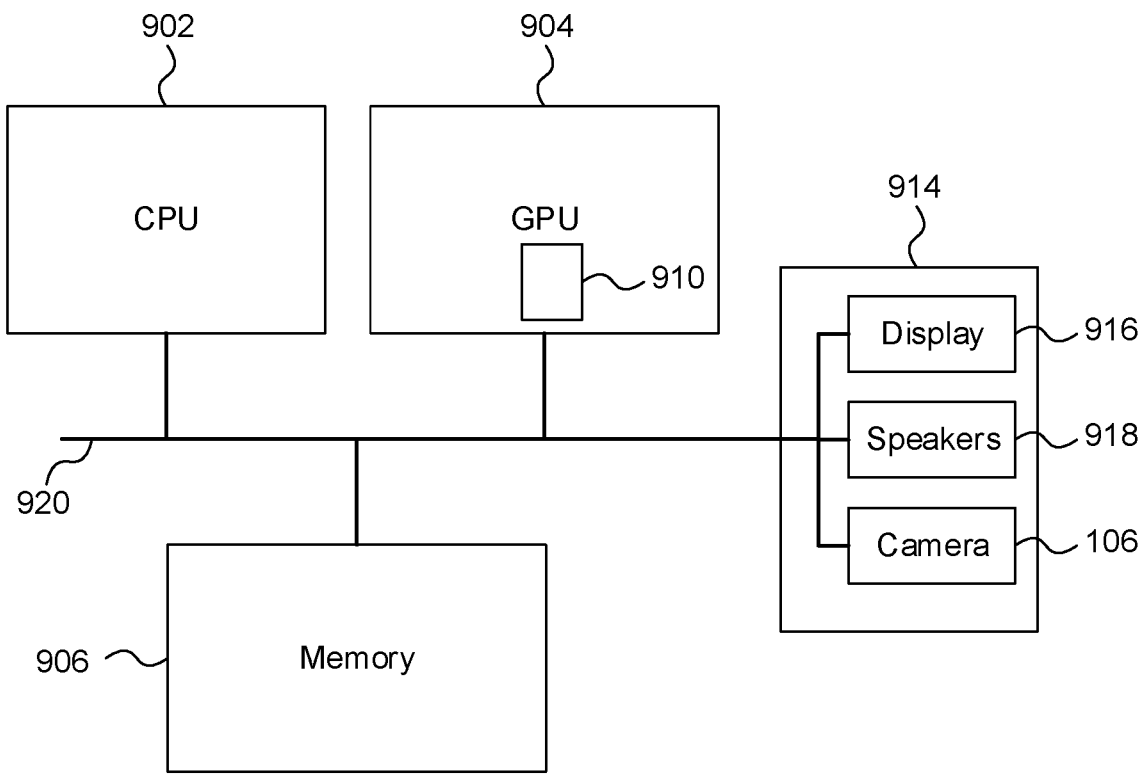
FIG. 7 shows a computer system in which a graphics processing system is implemented.

The processor described herein may be a graphics processing unit (GPU) or a central processing unit (CPU). FIG. 7 shows a computer system in which the processor described herein may be implemented. The computer system comprises a CPU 902, a GPU 904, a memory 906 and other devices 914, such as a display 916, speakers 918 and a camera 106. A processing block 910 (corresponding to processing blocks 100 and 400) is implemented on the GPU 904. In other examples, the processing block 910 may be implemented on the CPU 902. The components of the computer system can communicate with each other via a communications bus 920.

The operations described herein could be performed for any suitable data and not just pixel data. For example, the determination of a gradient (i.e., a rate of change) of data is useful in many applications and the processors described herein can determine those gradients by supplying data elements to the appropriate processing pipelines.

Conventionally, supplying the same data twice to a processing pipeline would be deemed to be superfluous, and may impact the performance of some processors. However, the inventors have found that supplying the same data twice can be advantageous and provide savings in chip area and reduce propagation delays. As demonstrated above, by doubling the amount of data supplied to the processor, the chip area for the processor can be reduced (whereas, conventionally, increasing the amount of data supplied to a processor would require additional logic and thus increased chip area).

The processors of FIGS. 1 and 3A-5D are shown as comprising a number of functional blocks. This is schematic only and is not intended to define a strict division between different logic elements of such entities. Each functional block may be provided in any suitable manner. It is to be understood that intermediate values described herein as being formed by a processor need not be physically generated by the processor at any point and may merely represent logical values which conveniently describe the processing performed by the processor between its input and output.

The processors described herein may be embodied in hardware on an integrated circuit. The processor described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a processor configured to perform any of the methods described herein, or to manufacture a processor comprising any apparatus described herein. An integrated circuit definition dataset may be, for example, an integrated circuit description.

There may be provided a method of manufacturing, at an integrated circuit manufacturing system, a processor as described herein. There may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor will now be described with respect to FIG. 8.

Figure 8:
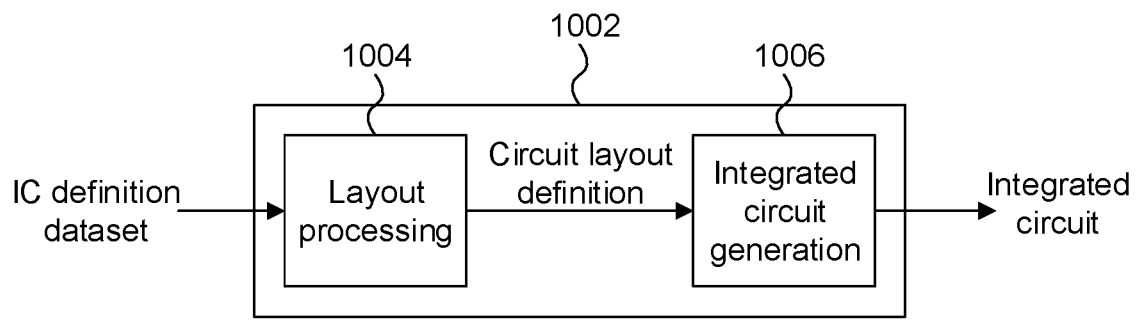
FIG. 8 is a schematic diagram of an integrated circuit manufacturing system.

FIG. 8 shows an example of an integrated circuit (IC) manufacturing system 1002 which is configured to manufacture a processor as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 1002 to manufacture an integrated circuit embodying a processor as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A processor comprising:
a controller configured to select a first mode or a second mode of operation for the processor in dependence on at least one instruction received for processing data at the processor; and
a plurality of processing pipelines, wherein each pipeline comprises:
a processing element having a first input and a second input;
a first supply line and a second supply line;
wherein a first pipeline of the plurality of processing pipelines further comprises:
a first multiplexer operable to select a supply line so that data from a selected supply line is received at the first input of the first pipeline via the first multiplexer of the first pipeline;
a second multiplexer operable to select a supply line so that data from a selected supply line is received at the second input of the first pipeline via the second multiplexer of the first pipeline,
wherein in the first mode and for the first pipeline, the first and second multiplexers of the first pipeline are configured to respectively select first and second supply lines of the first pipeline such that the processing element of the first pipeline receives data via the first and second supply lines of the first pipeline, wherein the first supply line of the first pipeline is capable of supplying data that is different to the data supplied by the second supply line of the first pipeline;
wherein, in the second mode and for the first pipeline:
the first multiplexer of the first pipeline is configured to select a supply line of another one of the plurality of pipelines;
the second multiplexer of the first pipeline is configured to select the second supply line of the first pipeline; and
the controller is configured to cause the second supply line of the first pipeline to supply the same data as the first supply line of the first pipeline.

2. The processor as claimed in claim 1, wherein, for each pipeline, the first and second supply lines are configured to supply data from private memory for the processing element of that pipeline.

3. The processor as claimed in claim 1, wherein the controller is configured to select the second mode in response to the at least one instruction comprising an instruction for at least one of the processing elements to process data from private memory for another one of the processing elements.

4. The processor as claimed in claim 1, wherein, in the second mode and for the first pipeline, the controller is configured to cause the second supply line to supply data from the same memory register as the first supply line.

5. The processor as claimed in claim 1, wherein, in the second mode and for the first pipeline, the first multiplexer selects one of the supply lines of another one of the plurality of pipelines so as to receive data from private memory for the processing element of the another pipeline.

6. The processor as claimed in claim 1, wherein the controller is configured to select the second mode when the at least one instruction received for processing data at the processor is a gradient operation.

7. The processor as claimed in claim 6, wherein the gradient operation is for determining the gradient between at least two pixel positions.

8. The processor as claimed in claim 1, wherein the controller is configured to select the second mode when the at least one instruction received for processing data at the processor is a maximum operation.

9. The processor as claimed in claim 8, wherein the maximum operation is for determining the maximum value of at least two pixel positions.

10. The processor as claimed in claim 1, wherein the controller is configured to select the second mode when the at least one instruction received for processing data at the processor is an averaging operation.

11. The processor as claimed in claim 10, wherein the averaging operation is for determining an average value of at least two pixel positions.

12. The processor as claimed in claim 1, wherein, the processor comprises more than two processing pipelines and, in the second mode, each of the first and second multiplexer of one of the processing pipelines is capable of selecting a supply line of the other processing pipelines.

13. The processor as claimed in claim 1, wherein each processing element is a fused multiply-add arithmetic logic unit.

14. The processor as claimed in claim 1, wherein the processor comprises four processing pipelines and each of the first and second multiplexer have no more than four selectable inputs.

15. The processor as claimed in claim 1, wherein the processor is capable of concurrently supporting a plurality of threads.

16. A method of processing data at a processor comprising a plurality of pipelines, each pipeline comprising: a processing element having a first input and a second input; and a first supply line and a second supply line, wherein first pipeline of the plurality of processing pipelines further comprises: a first multiplexer operable to select a supply line so that data from a selected supply line is received at the first input of the first pipeline via the first multiplexer of the first pipeline; and a second multiplexer operable to select a supply line so that data from a selected supply line is received at the second input of the first pipeline via the second multiplexer of the first pipeline, the method comprising:
receiving at least one instruction for processing data;
selecting a first mode or a second mode of operation for the processor in dependence on the at least one instruction;
if the first mode is selected and for the first pipeline:
selecting, by the first and second multiplexers of the first pipeline respectively, the first and second supply lines of the first pipeline such that the processing element of the first pipeline receives data via the first and second supply lines of the first pipeline, wherein the first supply line of the first pipeline is capable of supplying data that is different to the data supplied by the second supply line of the first pipeline;
if the second mode is selected and for the first pipeline:
selecting, by the first multiplexer of the first pipeline, a supply line of another one of the plurality of pipelines;
selecting, by the second multiplexer of the first pipeline, the second supply line of the first pipeline; and supplying the same data at the second supply line of the first pipeline as the first supply line of the first pipeline.

17. The method as claimed in claim 16, wherein, for each pipeline, the step of supplying the same data comprises supplying data from private memory for the processing element of that pipeline.

18. The method as claimed in claim 16, wherein the second mode is selected in response to the at least one instruction comprising an instruction for at least one of the processing element to process data from private memory for another one of the processing elements.

19. The method as claimed in claim 16, wherein, for the first pipeline, the step of supplying the same data comprises supplying data from the same memory register to the first and second supply lines.

20. A non-transitory computer readable storage medium having stored thereon a computer readable description of an integrated circuit that, when processed in an integrated circuit manufacturing system, causes the integrated circuit manufacturing system to manufacture a processor embodied in hardware on an integrated circuit, the processor comprising:
- a controller configured to select a first mode or a second mode of operation for the processor in dependence on at least one instruction received for processing data at the processor; and
- a plurality of processing pipelines, wherein each pipeline comprises:
  - a processing element having a first input and a second input;
  - a first supply line and a second supply line;
- wherein a first pipeline of the plurality of processing pipelines further comprises:
  - a first multiplexer operable to select a supply line so that data from a selected supply line is received at the first input of the first pipeline via the first multiplexer of the first pipeline;
  - a second multiplexer operable to select a supply line so that data from a selected supply line is received at the second input of the first pipeline via the second multiplexer of the first pipeline,
- wherein in the first mode and for the at least one pipeline, the first and second multiplexers of the first pipeline are configured to respectively select first and second supply lines of the first pipeline such that the processing element of the first pipeline receives data via the first and second supply lines of the first pipeline, wherein the first supply line of the first pipeline is capable of supplying data that is different to the data supplied by the second supply line of the first pipeline;
- wherein, in the second mode and for the first pipeline:
  - the first multiplexer of the at least one pipeline is configured to select a supply line of another one of the plurality of pipelines;
  - the second multiplexer of the first pipeline is configured to select the second supply line of the first pipeline; and
- the controller is configured to cause the second supply line of the first pipeline to supply the same data as the first supply line of the first pipeline.

* * * * *